DUAL ELECTRONIC MULTIPLIER FOR MULTIPLYING AN ANALOG SIGNAL BY TWO INDEPENDENT MULTIPLYING SIGNALS USING A SINGLE OPERATIONAL AMPLIFIER

Filed Dec. 22, 1966 2 Sheets-Sheet 1

FIG. I

INVENTOR.
JACK E. KRIPS
BY Julian C. Renfro
ATTORNEY

INVENTOR.
JACK E. KRIPS
BY Julian C. Renfro
ATTORNEY

United States Patent Office 3,484,595

Patented Dec. 16, 1969

3,484,595

DUAL ELECTRONIC MULTIPLIER FOR MULTIPLYING AN ANALOG SIGNAL BY TWO INDEPENDENT MULTIPLYING SIGNALS USING A SINGLE OPERATIONAL AMPLIFIER

Jack E. Krips, Orlando, Fla., assignor to Martin-Marietta Corporation, New York, N.Y., a corporation of Maryland Filed Dec. 22, 1966, Ser. No. 603,969

Int. Cl. G06g 7/16

U.S. Cl. 235—194 12 Claims

ABSTRACT OF THE DISCLOSURE

This disclosure describes a Dual Electronic Multiplier for multiplying an analog signal by two independent multiplying signals using a single operational amplifier rather than using two amplifiers as was done in the past. Multiplication is accomplished by changing the amplifier gain by varying the ratio of the impedance of the amplifier feedback circuit to the impedance of the amplifier input circuit. The impedances are varied by control signals which switch additional impedances into either the input or feedback circuits.

One embodiment of this application utilizes the invention of copending application of Robert W. McMillan, Ser. No. 604,269 filed Dec. 23, 1966, entitled Single Switch Gain Changer and assigned to the assignee of the present invention. The invention herein described was made in the course of or under a contract or subcontract thereunder with the Department of Defense.

The present invention relates to electronic multipliers and more particularly to an electronic multiplier utilizing a single operational amplifier for the multiplication of an analog quantity by more than one multiplying function.

In the past, several methods have been used for multiplying a voltage by a constant coefficient. One of the simplest ways being to employ a simple voltage divider such as a potentiometer where the relationship between the input voltage and the output voltage is determined by the resistance in the potentiometer.

A DC amplifier is also commonly used to multiply a variable input voltage by a constant coefficient. The output voltage of the amplifier is equal to the input voltage multiplied by the ratio of the feedback impedance to the input impedance. The input and feedback impedances can be changed by switching an impedance into their respective circuit and thus altering the multiplying coefficient.

It has also been suggested to switch impedances into the output of an amplifier to alter both the gain and bandwidth of the amplifier output and to vary the input and feedback impedances in accordance with some relationship to the analog function of the circuit such as an AGC type circuit.

In contrast to the above described prior art, the present dual electronic multiplier multiplies an analog function by two independent multiplying functions. The multiplying functions need have no relationship to the analog quantity being multiplied so that the multiplying function may be a sine wave, square wave, pulse, DC level or any other like function.

The present dual electronic multiplier comprises a single operational amplifier having a selectively variable impedance input network for providing two independent multiplying functions. The input network comprises a resistive ladder network including three parallel connected resistors, each having one terminal connected to a grounded or a shunting two-position switch. The switches may be selectively controlled in order to change the transfer function of the amplifier to provide different multiplying functions for the amplifier output.

As will be clear, the present invention may be used for any analog multiplication operation where it is desired to multiply by two independent functions. The analog computer art is one example where such a circuit may be adapted for use to simplify circuitry and improve reliability. A second desirable use may be in autopilot design for missiles or the like, where the analog circuit art is generally used and multiplication is often required in the implementation of the system equations.

Other objects, features, and advantages of this invention will be apparent from a study of the written description and the drawings in which.

Figure 1:
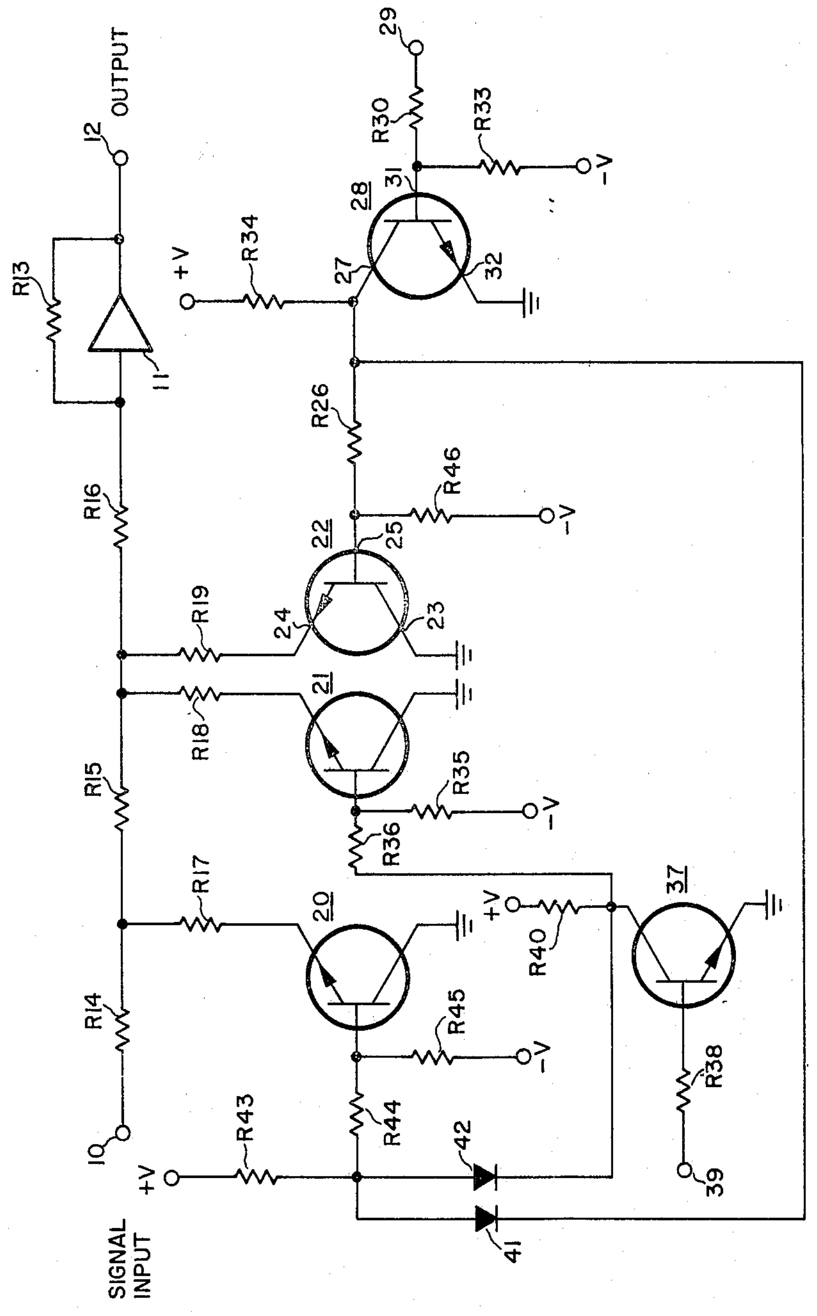
FIGURE 1 shows a schematic diagram of one embodiment of the present invention as might be used on one side of an operational amplifier.

Referring now to FIGURE 1, a schematic diagram is shown with an input terminal 10 which receives input signals which are fed through resistors $R_{14}$, $R_{15}$ and $R_{16}$ to a DC amplifier 11. A feedback circuit with an impedance, such as a resistor $R_{13}$ located therein, connects the output 12 from amplifier 11 to the input circuit fed by input 10. Resistor $R_{13}$ has been shown as the feedback impedance but other impedance circuits may also be used and might typically include a filter network similar to the feedback filter network shown in FIGURE 2.

Amplifier 11 has a gain proportional to the ratio of the feedback impedance to the input impedance:

$$e_{12}=e_{10}\frac{Z\text{ feedback}}{Z\text{ input}}$$

where $e_{12}$ is the output voltage, $e_{10}$ is the input voltage, and Z input is the input circuit impedance and Z feedback is the feedback circuit impedance.

The input circuit impedance is controlled by the values of series connected resistor $R_{14}$, $R_{15}$ and $R_{16}$ and in addition by resistor $R_{17}$, $R_{18}$ and $R_{19}$ which each connect the input circuit to ground through switching transistor 20, 21 and 22 respectively.

Transistors 20, 21 and 22 each have base, emitter, and collector electrodes and are switching transistors which normally operate in either a saturated or a cutoff state. This particular embodimnet shown NPN transistors connected as emitter follower circuits but it should be clear that PNP switching transistors as well as other operating configurations could be used without departing from the spirit and scope of the present invention.

Transistor 22 has its collector electrode 23 connected to ground, its emitter electrode 24 connected to one end of resistor $R_{19}$ and its base electrode connected through resistor $R_{46}$ to a bias voltage, —V, and through isolating resistor $R_{26}$ to the collector electrode 27 of transistor 28. Transistor 28 acts as a buffer stage for the control signal input received at control input terminal 29. A signal applied to terminal 29 is fed through resistor $R_{30}$ to the base electrode 31 of transistor 28. Emitter electrode 32 is connected to ground. A biasing voltage, —V, is connected to base electrode 31 through resistor $R_{33}$. Transistor 28 is a common emitter circuit using a switching transistor in much the same manner as described for transistor 22. The common emitter circuit will of course reverse the signal in passing from the base to the collector circuit while the signal phase is not reversed in the common collector circuit of transistors 20, 21 and 22. A positive voltage +V is placed on the collector 27 of transistor 28 through a resistor $R_{34}$.

Upon a signal being received at terminal 29, a voltage will be placed upon the base of transistor 28 which then changes from a cutoff state to a state of saturation, or from a state of very high resistance to a state of very low resistance. This will result in a lower voltage at the collector electrode 27 and cause a negative voltage to be placed upon the base electrode 25 of transistor 22. Transistor 22 then goes from a cutoff to a saturated state and thus the switch is closed or operative.

Transistor 21 operates in the same manner as transistor 22 and has base bias voltage —V connected through resistor $R_{35}$ to the base electrode, with its emitter connected to resistor $R_{18}$ and its collector connected to ground. The base electrode of transistor 21 is supplied signals through resistor $R_{36}$ from the collector of a buffer transistor 37 which operates in the same manner as transistor 28 and has its emitter connected to ground, its base connected through resistor $R_{38}$ to a second control signal input terminal 39. A positive DC voltage +V is applied to the collector through resistor $R_{40}$.

The collectors of transistors 28 and 37 also have their signals applied to diodes 41 and 42 respectively. Diodes 41 and 42 in conjunction with the +V applied through resistor $R_{43}$ act as an AND gate in that only when a voltage is applied to both cathodes of the diodes at the same time will a voltage be applied through isolating resistor $R_{44}$ to the base of transistor 20. A bias voltage —V is applied to the base electrode of transistor 20 through resistor $R_{45}$. As can be seen, transistor 20 will reach a saturated state only when both transistors 21 and 22 are in a saturated state and will be in a cutoff state when either one or both of transistors 21 or 22 are in a cutoff state.

When transistors 20, 21 and 22 are in a cutoff state the gain of amplifier 11 as described in Equation 1 beocmes:

$$e_{12}=e_{10}\frac{R_{13}}{R_{14}+R_{15}+R_{16}} \tag{2}$$

and when a control signal is received at terminal 29 and no signal is received at terminal 39, transistor 22 will become saturated and Equation 1 will become:

$$e_{12}=e_{10}\frac{R_{13}}{\frac{(R_{14}+R_{15})R_{16}}{R_{19}}+R_{14}+R_{15}+R_{16}} \tag{3}$$

When a control signal is received at terminal 39 but not at terminal 29, transistor 21 will become saturated while transistors 20 and 22 will remain cutoff and the gain equation will become:

$$e_{12}=e_{10}\frac{R_{13}}{\frac{(R_{14}+R_{15})R_{16}}{R_{18}}+R_{14}+R_{15}+R_{16}} \tag{4}$$

If signals are received at terminals 29 and 39 simultaneously, transistors 20, 21 and 22 will become saturated and the gain equation will become:

$$e_{12}=e_{10}\frac{R_{13}}{\frac{R_{15}+R_{16}+R_{15}R_{16}(R_{18}+R_{19})}{R_{18}R_{19}}+R_{14}+\frac{R_{14}(R_{15}+R_{16})}{R_{18}R_{19}R_{17}}+\frac{R_{15}R_{16}R_{14}(R_{18}+R_{19})}{R_{18}R_{19}R_{17}}} \tag{5}$$

As can be seen at this point a circuit has been provided for the multiplication of two independent functions upon a single electronic signal using one DC differential amplifier. While transistor switching circuits have been described it should be understood that other switching circuits may also be utilized and while a diode AND gate is used, other AND gate circuits may also be employed without departing from the spirit and scope of the invention.

Applicant does not wish to be limited to any particular circuit values for the embodiment of the invention described in connection with FIGURE 1, but the following set of representative values have been found to be suitable in this circuit:

| | | |
|---|---|---|
| $R_{13}$ | ohms | 86.6K |
| $R_{14}$ | do | 3.83K |
| $R_{15}$ | do | 1.69K |
| $R_{16}$ | do | 2.87K |
| $R_{17}$ | do | 261 |
| $R_{18}$ | do | 196 |
| $R_{19}$ | do | 205 |
| $R_{30}$ | do | 511 |
| $R_{33}$ | do | 4.22K |
| $R_{34}$ | do | 340 |
| $R_{46}$, $R_{35}$ | do | 2.37K |
| $R_{26}$, $R_{36}$, $R_{44}$ | do | 681 |
| $R_{40}$ | do | 340 |
| $R_{38}$ | do | 825 |
| $R_{43}$ | do | 536 |
| $R_{45}$ | do | 2.15K |
| Diodes **41** and **42** | do | 1N916 |
| Transistors **20, 21, 22, 28** and **37** | do | 2N918 |
| Voltages | | +12VDC and —12VDC |

Figure 2:
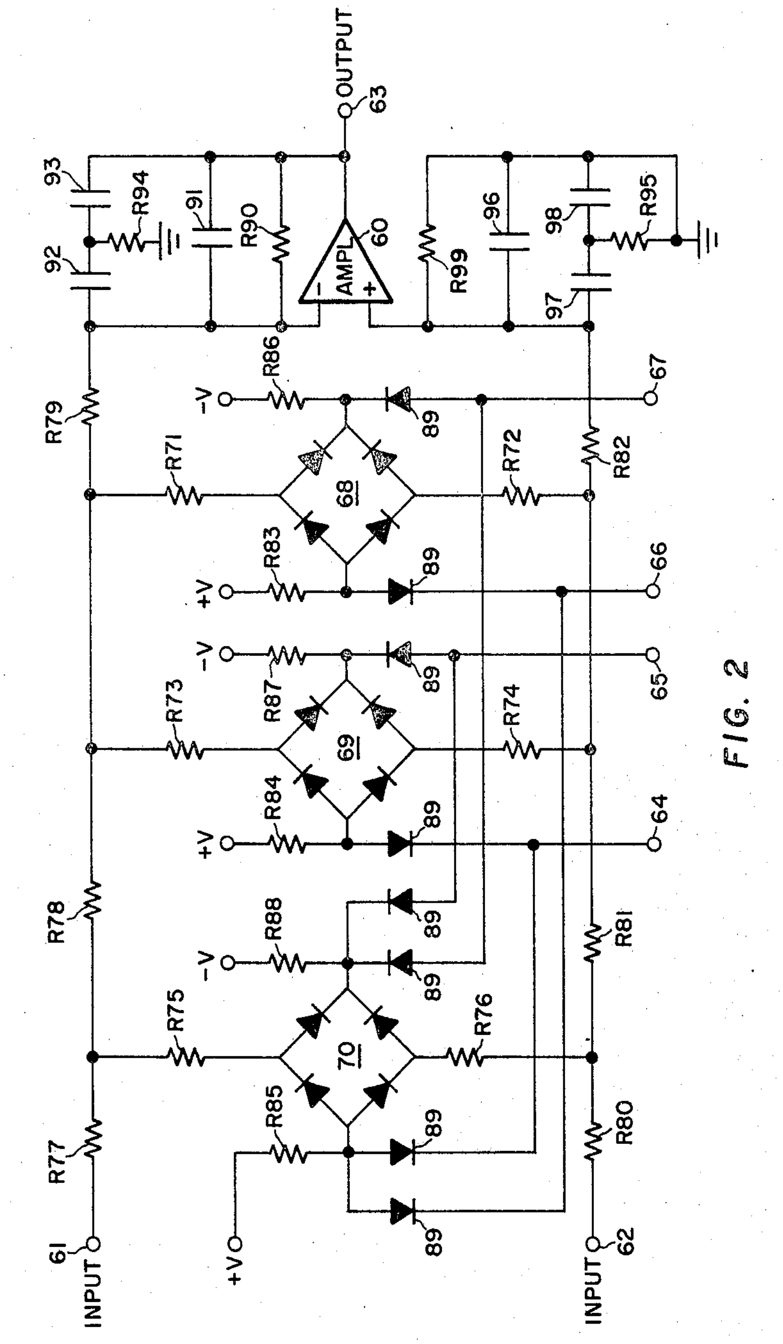
FIGURE 2 shows a schematic diagram of a second embodiment of the present invention.

Referring now to FIGURE 2, a second embodiment of the present invention is seen in which diode bridge switches are used and the circuit is balanced on both sides of the input in accordance with the copending application of Robert W. McMillan, Ser. No. 604,269, filed Dec. 23, 1966, entitled Single-Switch Gain Changer. A differential amplifier 60 has two signal inputs 61 and 62, an output 63 and four control signal inputs 64, 65, 66, and 67. The signal input at 64 is the same but 180° out-of-phase with the signal input at 65 and similarly the signal input at 66 is the same as but 180° out-of-phase with signals received at input 67. The control signals may have any of a number of circuits to produce the 180° out-of-phase signals but I have found bistable multivibrators to operate satisfactorily in this respect. A bistable multivibrator has 2 stable states in which an input signal will switch the multivibrator from one stable state to the other stable state. Each of the two control inputs is connected to opposite outputs of the multivibrator where out-of-phase signals are obtained since each output from the multivibrators is 180° out-of-phase with the other output.

Three diode bridge switches 68, 69 and 70 are used which shunt one side of the amplifier input to the opposite side through pairs of resistors $R_{71}$, $R_{72}$; $R_{73}$, $R_{74}$, and $R_{75}$, $R_{76}$, respectively. Three resistors $R_{77}$, $R_{78}$ and $R_{79}$ make up the input impedance circuit on one side of the amplifier when all the switches 68, 69 and 70 are open or inoperative and resistors $R_{80}$, $R_{81}$ and $R_{82}$ make up the input impedance circuit on the other side of the amplifiers when the switches 68, 69 and 70 are open. As described in FIGURE 1 these input impedances are selectively altered by control signals operating switches 68, 69 and 70.

Switches 68, 69 and 70 have plus voltages (+V) isolated by resistors $R_{83}$, $R_{84}$ and $R_{85}$ located on one side of each switch and negative voltages (−V) isolated by resistors $R_{86}$, $R_{87}$ and $R_{88}$ on the opposite side of the switches. These + and − voltages are normally maintained low by the open diodes 89. A 180° out-of-phase signal placed on control inputs 66 and 67 will close diodes 89 for switch 68, thus increasing the resistance through the diodes, and placing a −V on the cathode and the positive +V on the anodes of switch 68 bridging diodes thus opening the diodes to the flow of current. The flow of current through the bridging diode renders switch 68 operative or closed and places resistors $R_{71}$, $R_{72}$ in the impedance circuit. Switch 69 operates in the same manner upon receiving a control signal at inputs 64, 65.

Switch 70 on the other hand is operative only when signals are received at both sets of control inputs 64, 65, and 66, 67 simultaneously since the switch 70 has two sets of input diodes 89 forming an AND gate whereby a voltage is placed on the switch 70 bridge diodes only when a signal places a voltage on both diodes 89 on each side of switch 70.

The amplifier 60 has a feedback circuit with a feedback impedance primarily made up of resistor $R_{90}$ but also including a filter network made up of capacitors 91, 92 and 93 and resistor $R_{94}$. The opposite side of amplifier 60 has a grounded impedance circuit to balance the feedback circuit and which is the same as the feedback circuit with resistor $R_{99}$ and filter network made up of resistor $R_{95}$ and capacitors 96, 97 and 98. The filter networks are used primarily to filter out the switching frequency of switches 68, 69 and 70.

The present circuit operates in the same manner and with the same result as described in FIGURE 1 except that bridging diode switches are used in place of transistor switches, thus requiring the 180° out-of-phase control signals, and instead of each side of the amplifier having the switching circuits switching the input through an impedance to ground the switches shunt the impedance between the inputs to the amplifier. The diode bridge switches help make this embodiment radiation hardened for a gamma and neutron environment and therefore more reliable for military and space purposes.

The applicant does not wish to be limited to this embodiment of his invention but the following set of representative values has been found to be suitable:

| | | |
|---|---|---|
| Diodes **89** | | 1N916 |
| Switches **68, 69,** and **70** diodes | | 1N916 |
| Resistors: | | |
| $R_{77}$, $R_{80}$ | ohms | 3.48K |
| $R_{78}$, $R_{81}$ | do | 1.78K |
| $R_{79}$, $R_{82}$ | do | 3.16K |
| $R_{85}$, $R_{88}$, $R_{84}$, $R_{87}$, $R_{83}$, $R_{86}$ | do | 4.22K |
| $R_{75}$, $R_{76}$ | do | 261 |
| $R_{73}$, $R_{74}$ | do | 196 |
| $R_{71}$, $R_{72}$ | do | 205 |
| $R_{90}$, $R_{94}$ | do | 86.6K |
| $R_{94}$, $R_{95}$ | do | 215 |
| Capacitors **92, 93, 97** and **98** | mf | .047 |
| Capacitors **91** and **96** | mf | .0022 |
| +V and −V | | +12 VDC and −12 VDC |

A second embodiment has thus been provided for the multiplication of two independent functions upon a single electronic signal using one DC differential amplifier by selectively varying the impedance of the input resistance to the amplifier. As has been described the switches are selectively controlled in order to change the transfer function of the amplifier to provide different multiplying functions for the amplifier output.

While two types of switches have been illustrated in two preferred embodiments, other switching circuits may also be used.

This invention is not to be construed as limited to the particular forms disclosed herein, since these are to be regarded as illustrative rather than restrictive.

I claim:

1. A dual electronic multiplier for the multiplication of a single electronic signal by two independent functions having amplifier means including an input circuit, an output circuit, and a feedback circuit connected between said input and output circuits, said amplifier having a gain proportional to the ratio of the feedback circuit impedance to the input circuit impedance, wherein the improvement comprises: first and second switching circuits each including an impedance therein for varying the ratio of the feedback circuit impedance to the input circuit impedance upon receiving a control signal; and a third switching circuit including an impedance therein for varying the ratio of the feedback circuit impedance to the input circuit impedance upon control signals being received by said first and second switching circuits simultaneously.

2. The electronic multiplier according to claim 1, but including an AND gating circuit connected between said third switching means and said first and second switching means whereby a voltage will be placed upon said third switching means when control signals are received at said first and second switching circuits simultaneously.

3. The multiplier according to claim 2 in which said first and second switching circuits vary the ratio of the feedback circuit impedance to the input circuit impedance by varying only the input circuit impedance.

4. The multiplier according to claim 3 in which said third switching circuit varies the ratio of the feedback circuit impedance to the input circuit impedance by varying only the input circuit impedance.

5. The circuit according to claim 4 in which said impedance in said first and second switching circuit is a resistance.

6. The circuit according to claim 5 in which said impedance in said third switching circuit is a resistance.

7. A dual electronic multiplier for the multiplication of a single electronic signal by two independent functions using a single amplifier circuit comprising:

(a) an operational amplifier circuit having an input circuit for receiving input signals and an output circuit for receiving output signals;

(b) first, second, and third impedance switching means, each for selectively switching an impedance into the input circuit;

(c) first control input circuit for closing said first impedance switching circuit upon receiving a voltage signal;

(d) second control input circuit for closing said second impedance switching circuit upon receiving a voltage signal; and (e) AND gating means for closing said third impedance switching means when a signal is received at said first and second control input circuits simultaneously;

(f) whereby said amplifier gain may be varied by control signals being received at either said first control input circuit or said second control input circuit or at said first and second control inputs simultaneously.

8. The multiplier according to claim 7 in which each said first, second, and third impedance switching means are disposed to selectively to connect the amplifier input circuit to ground through their respective impedances.

9. The multiplier according to claim 8 in which each said first, second and third impedance switching means includes resistors connected in series with electronic switches.

10. The multiplier according to claim 7 in which said first, second and third impedance switching means are each connected to each of two inputs of said input circuit whereby each said first, second and third impedance switching means is connected to shunt input signals through an impedance between said two inputs of said input circuit.

11. The multiplier according to claim 10 in which each said first, second and third impedance switching means includes a transistor connected to operate in either a saturated or a cutoff state.

12. The multiplier according to claim 10 in which said AND gate includes a pair of switching diodes.

References Cited

UNITED STATES PATENTS

| | | | |
|---|---|---|---|
| 3,050,662 | 8/1962 | Miller et al. | 307—321 |
| 3,281,608 | 10/1966 | Doyle | 307—253 X |
| 3,293,424 | 12/1966 | Fisher | 235—194 |
| 3,297,963 | 1/1967 | Halsted | 307—253 X |
| 3,374,362 | 3/1968 | Miller | 307—254 X |

MALCOLM A. MORRISON, Primary Examiner

JOSEPH F. RUGGIERO, Assistant Examiner

U.S. Cl. X.R.

307—229